(12) United States Patent
Lambert et al.

(10) Patent No.: US 12,393,987 B1
(45) Date of Patent: Aug. 19, 2025

(54) METHODS AND APPARATUS FOR AUTOMATED INSURANCE CLAIM PROCESSING USING HISTORICAL DATA

(71) Applicant: STATE FARM MUTUAL AUTOMOBILE INSURANCE COMPANY, Bloomington, IL (US)

(72) Inventors: Holly Lambert, Roswell, GA (US); Michelle Delynn Adler, Sugar Hill, GA (US); Song Zheng, Duluth, GA (US); Joshua Zaks, Alpharetta, GA (US); Orr Epstein, Atlanta, GA (US); Ryan Monroe, Dacula, GA (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 439 days.

(21) Appl. No.: 16/693,031

(22) Filed: Nov. 22, 2019

Related U.S. Application Data

(60) Provisional application No. 62/815,711, filed on Mar. 8, 2019.

(51) Int. Cl.
*G06Q 40/08* (2012.01)
*G06F 16/2458* (2019.01)
(Continued)

(52) U.S. Cl.
CPC ......... *G06Q 40/08* (2013.01); *G06F 16/2462* (2019.01); *G06N 20/00* (2019.01); *G06Q 10/10* (2013.01)

(58) Field of Classification Search
CPC ........ G06Q 40/08; G06Q 10/10; G06N 20/00; G06F 16/2462
(Continued)

(56) References Cited

U.S. PATENT DOCUMENTS 7,348,895 B2 * 3/2008 Lagassey ............. G08G 1/0116
  701/1
7,889,931 B2 * 2/2011 Webb ................. G01N 21/8851
  382/209
(Continued)

FOREIGN PATENT DOCUMENTS

CA    3056989 A1 *  3/2020   ............... G06N 3/08
CN  106056145 A  * 10/2016  ....... G06F 17/30964
(Continued)

OTHER PUBLICATIONS

Title: Vehicle Insurance Calculator Using Augmented Reality Authors: N Jayanth, et al. Date: Mar. 1, 2019 (Year: 2019).*

*Primary Examiner* — Bennett M Sigmond
*Assistant Examiner* — Yongsik Park
(74) *Attorney, Agent, or Firm* — Lee & Hayes, P.C.

(57) ABSTRACT

Example methods, apparatus and articles of manufacture to process insurance claims using historical data are disclosed herein. An example method of estimating damage to a vehicle, the method includes receiving, using one or more processors, one or more images of damage to a vehicle, identifying, using one or more processors, one or more additional vehicles having damage similar to the damage to the vehicle based on the one or more images, determining, using one or more processors, a likelihood that a part of the vehicle is damaged based on damage associated with the one or more additional vehicles, and determining, using one or more processors, whether to include the part in a repair estimate based on the likelihood.

20 Claims, 4 Drawing Sheets

(51) Int. Cl.
*G06N 20/00* (2019.01)
*G06Q 10/10* (2023.01)

(58) Field of Classification Search
USPC .............................................................. 705/4
See application file for complete search history.

(56) References Cited

U.S. PATENT DOCUMENTS

| | | | |
|---|---|---|---|
| 9,218,698 B2* | 12/2015 | Ricci | B60Q 1/544 |
| 9,886,771 B1* | 2/2018 | Chen | G06F 3/04845 |
| 9,904,928 B1* | 2/2018 | Leise | G06Q 30/0185 |
| 10,304,137 B1* | 5/2019 | Genser | G06Q 40/08 |
| 10,762,385 B1* | 9/2020 | Yang | G06V 10/82 |
| 11,087,292 B2* | 8/2021 | Utke | G06Q 10/20 |
| 2015/0032580 A1* | 1/2015 | Altermatt | H04N 7/181 |
| | | | 705/28 |
| 2017/0293894 A1* | 10/2017 | Taliwal | G06V 10/82 |
| 2017/0352104 A1* | 12/2017 | Hanson | G06Q 40/08 |
| 2018/0182039 A1* | 6/2018 | Wang | G06V 20/10 |
| 2018/0260793 A1* | 9/2018 | Li | G06Q 40/08 |
| 2020/0258208 A1* | 8/2020 | Lota | G06N 20/00 |

FOREIGN PATENT DOCUMENTS

| | | | | |
|---|---|---|---|---|
| CN | 109359542 A * | 2/2019 | | G06F 18/24 |
| KR | 102097120 B1 * | 7/2019 | | |
| WO | WO-2013093932 A2 * | 6/2013 | | G06K 9/4604 |

* cited by examiner

METHODS AND APPARATUS FOR AUTOMATED INSURANCE CLAIM PROCESSING USING HISTORICAL DATA

RELATED APPLICATION

This patent claims the benefit of and priority to U.S. Provisional Patent Application Ser. No. 62/815,711, which was filed on Mar. 8, 2019. U.S. Provisional Patent Application Ser. No. 62/815,711 is hereby incorporated herein by reference in its entirety.

FIELD OF THE DISCLOSURE

This disclosure relates generally to insurance claim processing, and, more particularly, to methods, apparatus and articles of manufacture to process insurance claims using historical data.

BACKGROUND

Damage may occur to a vehicle under a number of circumstances. For example, acts of nature such as inclement weather, animals, and/or human-involved accidents may cause damage to a vehicle. The damage may be unsightly or even dangerous and, thus, require restorative repairs.

Figure 1:
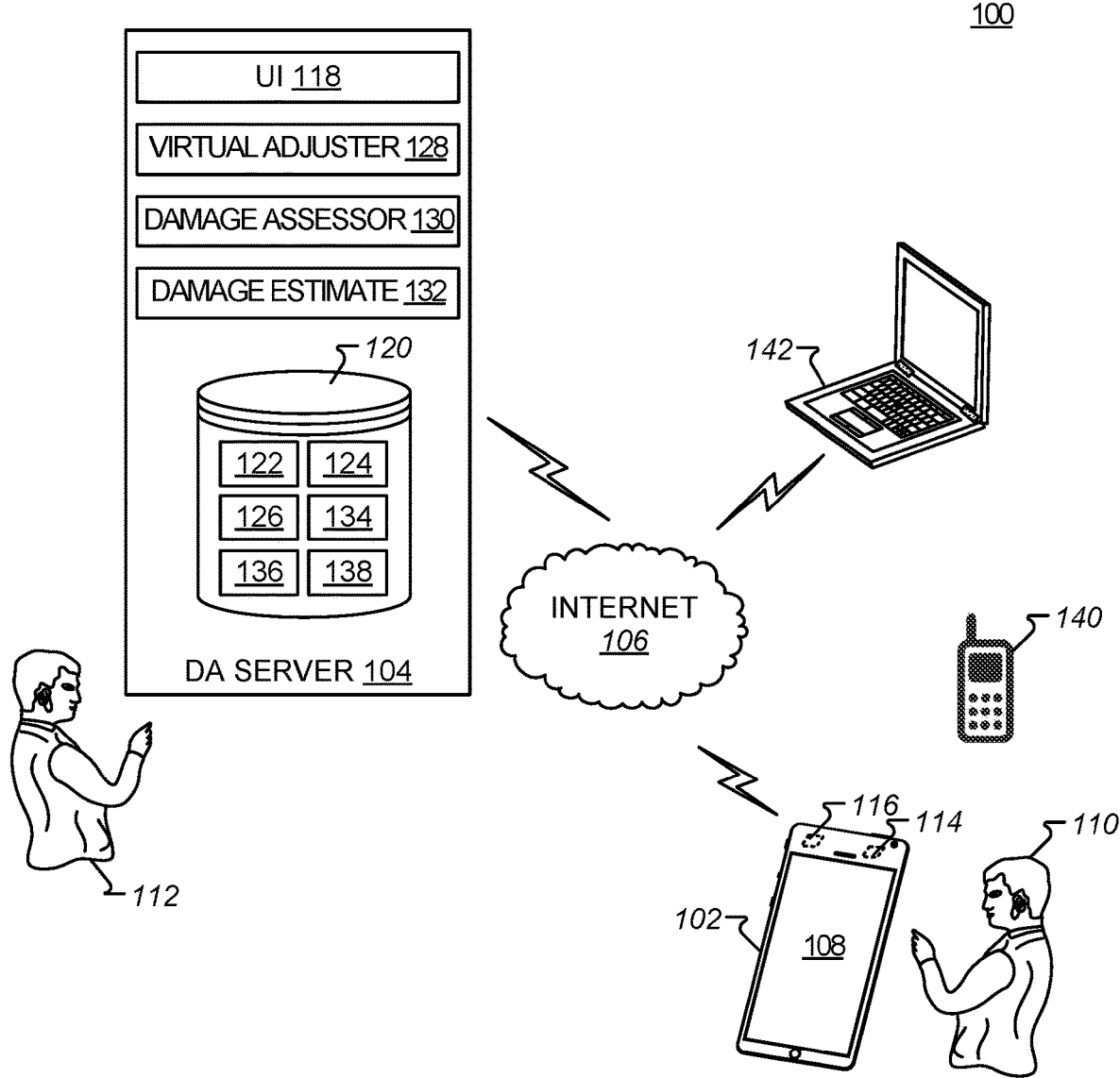
FIG. 1 is a block diagram of an example system to capture images of damage and to estimate a cost to repair the damage.

The figures depict embodiments of this disclosure for purposes of illustration only. One skilled in the art will readily recognize from the following discussion that alternate embodiments of the structures and methods illustrated herein may be employed without departing from the principles set forth herein.

In general, the same reference numbers will be used throughout the drawing(s) and accompanying written description to refer to the same or like parts. The figures are not to scale. Connecting lines or connectors shown in the various figures presented are intended to represent example functional relationships and/or physical or logical couplings between the various elements.

DETAILED DESCRIPTION

In the event that damage to property (e.g., a motor vehicle, a car, a truck, a motorcycle, a boat, etc.) arises from a damage-causing event, claim adjusters are tasked with assessing the extent of the damage to determine an estimate of the cost to complete repairs. Generally speaking, the adjuster must obtain measurements and images of damage (e.g., the size of a damaged area, which components of the vehicle that are damaged, etc.) as well as other relevant information to assess the extent of the damage. A damaged vehicle may require multiple assessments to get an accurate evaluation of the damage. This process of receiving one or more assessments may be time-consuming and costly.

To reduce or eliminate some or all of these, or other problems of conventional insurance claim processing, example methods, apparatus and articles of manufacture to process insurance claims using historical data are disclosed. Disclosed examples use images captured of damage and historical damage information for other vehicles to estimate components that are likely to be damaged, and to estimate the cost associated with repairing these components. While, for sake of clarity, examples are described herein with respect to damage to vehicles, aspects of this disclosure also relate to damage to other forms of property (e.g., a house, a garage, etc.). Further, while examples are described herein with reference to insurance claims, disclosed methods, apparatus, and articles of manufacture may be used to estimate what is required to repair damage, carry out an improvement, etc. that is not related to an insurance claim.

Reference will now be made in detail to non-limiting examples, some of which are illustrated in the accompanying drawings.

FIG. 1 is a block diagram of an example system 100 to capture images of damage, and to estimate a cost to repair the damage. The system 100 may include front end components (e.g., a client device 102) and backend components (e.g., a damage assessment (DA) server 104) in communication with each other via one or more computer networks, such as the Internet 106, a local area network (LAN), a metropolitan area network (MAN), a wide area network (WAN), a mobile, a wired network, a Wi-Fi® network, a cellular network, a wireless network, a private network, a virtual private network, etc.

While not shown for clarity of illustration, the system 100 of FIG. 1 (e.g., the client device 102, the DA server 104, etc.) include various software, machine-readable instructions, or computer-executable instructions, and hardware components (e.g., a processor) that may execute the software or instructions to capture images of reported or claimed damage, and to estimate a cost to repair the damage. The software or instructions may be stored on non-transitory or tangible computer- or machine-readable storage memories or disks for execution on the system 100. The software or instructions may be stored in various locations, including separate repositories or physical locations. The software or instructions may perform the various tasks associated with capturing images of reported or claimed damage, and estimating a cost to repair the damage, as herein described. The system 100 also includes data communication components for communicating between devices.

The client device 102, among other things, provides a user interface (UI) 108 (e.g., a graphical user interface (GUI), an application, a plugin, a web browser, etc.) that enables a person 110 to use the client device 102 to take images of reported or claimed damage, provide the images to the DA server 104, interact with the DA server 104, interact with a human adjuster or agent 112, etc. The client device 102 includes an imaging sensor (e.g., a camera 114), or is coupled to an imaging device (e.g., a camera), that enables the person 110 to capture images of their reported or claimed damage with the client device 102 using, for example, the UI 108, a button of the client device 102, etc. The client device 102 includes a non-transitory machine-readable storage memory 116 or disks for storing captured images.

Example client devices 102 include, but are not limited to, a personal computer, a smartphone, a tablet computer, a camera, or other suitable computing device. In some examples, the client device 102 is a drone (i.e., an unmanned aerial vehicle having an imaging sensor coupled thereto), or the client device 102 is communicatively coupled to a drone. The UI 108 may communicate with the DA server 104 through, for example, the Internet 106.

The DA server 104, among other things, provides a UI 118 (e.g., a GUI, an application, a web browser, etc.) that enables a person (e.g., the adjuster or agent 112) to use the DA server 104 to estimate the cost to repair damage, interact with the person 110, etc. The DA server 104 includes a repository 120 for storing images 122 of damage from a damage-causing event, and a database 124 of images of damage arising from other damage-causing events. The database 124 may also store calculated damage information, processes or algorithms (e.g., machine learning algorithm(s) 126) for calculating damage estimates, data that may be necessary for evaluating damages to vehicles, etc. In some examples, the repository 120 is implemented separately from the DA server 104 and accessed via a public or private network (e.g., the Internet 106).

The DA server 104 includes a virtual adjuster 128 and a damage assessor 130 to determine an automated damage estimate 132 (e.g., an estimate of the cost(s) to repair reported or claimed damage caused by a customer's damage-causing event). The virtual adjuster 128 uses the images 122 captured by the person 110 using their client device 102. The virtual adjuster 128 uses the images 122 to determine the likelihood that a part is damaged and, if damaged, the cost to repair. The virtual adjuster 128 queries the damage assessor 130 to determine the likelihood (e.g., as a percentage) that a part is damaged. In some examples, the damage assessor 130 runs on a first server (e.g., the DA server 104), with the repository 120 and the virtual adjuster 128 running on a second server.

The virtual adjuster 128 determines (e.g., calculates) the damage estimate 132 based on a customer's images 122 of their damage, and the database 124 of historical images of damage for other damage-causing events or other damage related information. A damage estimate 132 can be in the form of a monetary value for the cost of repairs, a numeric score indicating the severity of the damage, etc. A damage estimate can be an assessment of the damage to any vehicle (car, motorcycle, truck, etc.) of any make/model/year.

The damage assessor 130 identifies in the historical images 124 a set of historical images of vehicles that are similar to the captured images (e.g., same make/model of vehicle, same type of damage, e.g., side impact to passenger front door, etc.) and have similar damage. The damage assessor 130 identifies in the set of historical images those that most closely match (e.g., same location on door, same depth of dent, etc.) the damage being assessed. For those that most closely match, the damage assessor 130 uses damage records (e.g., insurance claim records) to estimate the probability that certain parts are damaged. For example, 70% of the vehicles associated with the matching damage have part X damaged. In some examples, the damage assessor 130 implements the machine learning algorithm(s) 126 to identify applicable historic images and determine the likelihood of parts being damaged. In some examples, the adjuster 112 uses the damage assessor 130 while preparing an estimate to identify the likelihood that parts are damaged.

In some examples, previously created damage estimates 132 are used to determine other damage estimates 132. Further, the damage estimate 132 can be evaluated or compared to actual damages to determine the accuracy of the damage estimate 132. The analysis of the damage estimate 132 can be implemented to refine machine learning algorithms 126 for determining future damage estimates 132.

In some examples, the machine learning algorithm(s) 126 are refined (e.g., continually) through machine learning, and many different machine learning algorithm(s) 126 can be created and applied to create the damage estimate 132. For example, machine learning algorithm(s) 126 may be made for specific makes or models of vehicles. In some examples, the machine learning algorithm(s) 126 are configured to calculate damage estimates 132 to particular areas of vehicles (e.g., the fender, the bumper, etc.). In some examples, two or more machine learning algorithms 126 are used in combination to determine damage estimates.

The repository 120 may, additionally or alternatively, store manufacturer's data 134, insurance data 136, and repair data 138 that the virtual adjuster 128 or the damage assessor 130 can use to determine damage estimates 132. The manufacturer's data 134 may include data for creating damage estimates 132 from data provided by vehicle manufacturers. The manufacturer's data 134 may include data indicative of the price of components of a vehicle. In some examples, the damage assessor 130 analyzes one or more images of a damaged vehicle to determine which components may have been damaged. If the damage assessor 130 determines that a component is likely damaged beyond repair, the damage assessor 130 may retrieve data indicating the price of replacement from the manufacturer's data 134. In some examples, the damage assessor 130 is also able to retrieve the price of components from third-party databases of parts manufacturers or other resources.

The manufacturer's data 134 may also include data such as 3-D models of vehicles. In some examples, the virtual adjuster 128 or the damage assessor 130 analyzes one or more received images of the vehicle in comparison to the one or more 3-D models (corresponding to a vehicle of a similar make/model/year) to determine which component(s) of the vehicle are likely damaged, and to determine the extent of the damage to the components. The manufacturer's data 134 may also include other data relevant to vehicles that may be used by the virtual adjuster 128 or the damage assessor 130 to create damage estimates 132.

The insurance data 136 may include data from insurance providers such as claims data, accident reports, or other data that may be used to estimate damage to a vehicle. In some examples, the insurance data 136 is used to determine damage estimates 132. In some examples, the insurance data 136 may be used to access actual damage that may be used, in conjunction with the damage estimate 132, to refine one or more machine learning algorithm(s) 126. For example, the insurance data 136 may include a claim with one more images of a vehicle which may be used to determine the damage estimate 132. Additionally or alternatively, the insurance data 136 may include a claim with one or more images of a vehicle and a cost of repair for the vehicle which may be used as for comparison to determine damage estimates 132 for another vehicle.

The repair data 138 may include data from one or more sources indicative of the cost of repair for vehicles. The repair data 138 may include images, labor costs, location data, dealership data, parts data, or any other data that may be useful for estimating damage to a vehicle.

In some examples, the person 110 interacts with the DA server 104, the adjuster or agent 112, or another agent (not shown) associated with an insurance company via a telephone 140 or a personal computer (PC) 142.

While the example DA server 104 and/or, more generally, the example system 100 to capture images of reported or claimed damage, and to estimate a cost to repair the damage are illustrated in FIG. 1, one or more of the elements, processes and devices illustrated in FIG. 1 may be combined, divided, re-arranged, omitted, eliminated or implemented in any other way. Further, the DA server 104 and/or, more generally, the system 100 may include one or more elements, processes or devices in addition to, or instead of, those illustrated in FIG. 1, or may include more than one of any or all of the illustrated elements, processes and devices.

Figure 2:
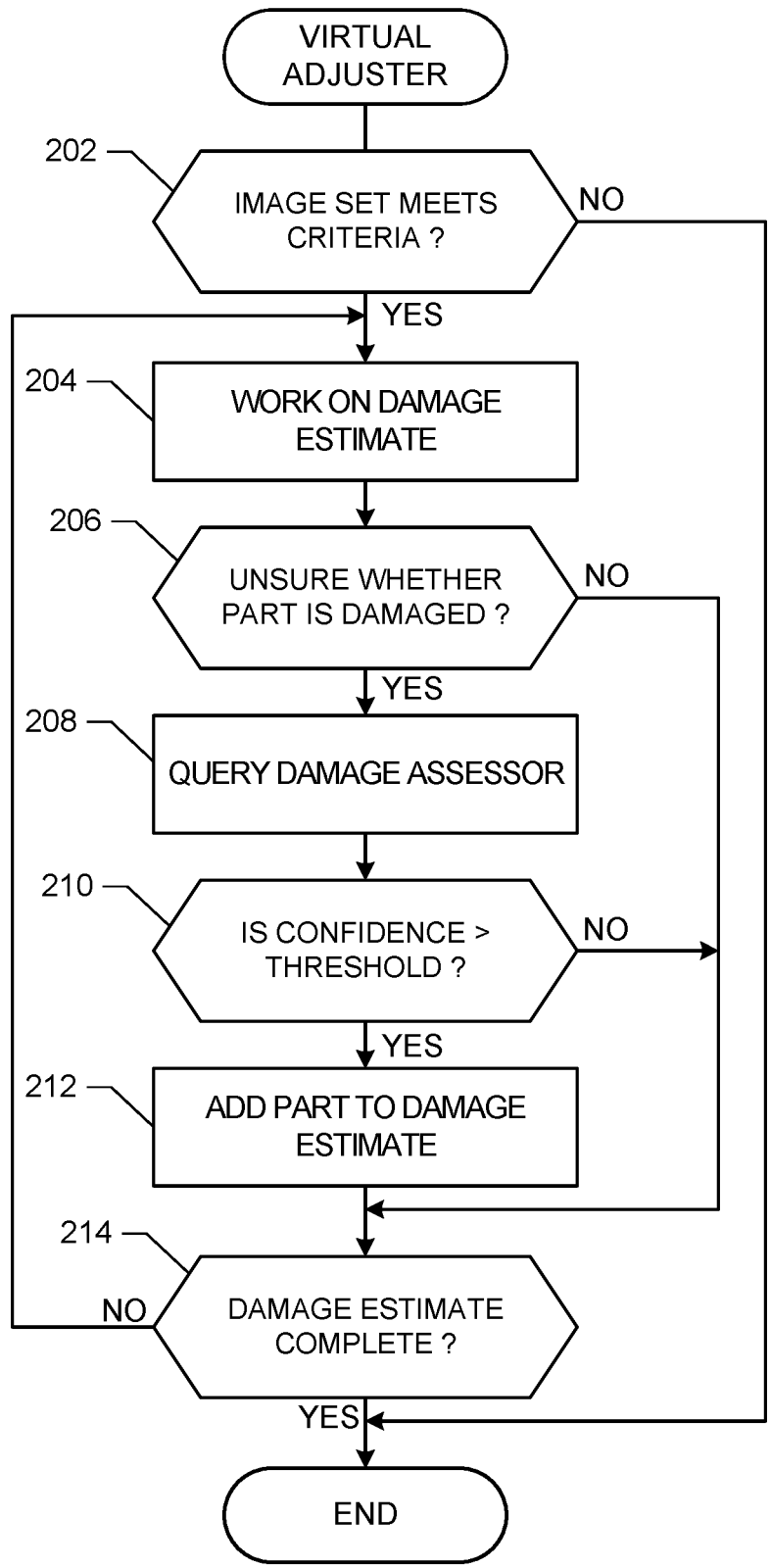
FIG. 2 is a flowchart representative of an example method, hardware logic or machine-readable instructions for implementing the example virtual appraiser of FIG. 1, in accordance with disclosed embodiments.

A flowchart 200 representative of example processes, methods, software, computer- or machine-readable instructions, etc. for implementing the virtual adjuster 128 is shown in FIG. 2. The processes, methods, software and instructions may be an executable program or portion of an executable program for execution by a processor such as the processor 402 of FIG. 4. The program may be embodied in software or instructions stored on a non-transitory computer- or machine-readable storage medium such as a compact disc (CD), a hard drive, a digital versatile disk (DVD), a Blu-ray disk, a cache, a flash memory, a read-only memory (ROM), a random access memory (RAM), or any other storage device or storage disk associated with the processor 402 in which information is stored for any duration (e.g., for extended time periods, permanently, for brief instances, for temporarily buffering, and/or for caching of the information). Further, although the example program is described with reference to the flowchart illustrated in FIG. 2, many other methods of implementing the example virtual adjuster 128 may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, an application specific integrated circuit (ASIC), a programmable logic device (PLD), a field programmable gate array (FPGA), a field programmable logic device (FPLD), a logic circuit, etc.) structured to perform the corresponding operation without executing software or instructions.

The example process starts with the virtual adjuster 128 determining whether a set of captured images complies with a set of criteria (block 202). For example, the virtual adjuster 128 determines whether the images 122 were taken from a prescribed set of positions and angles, with appropriate lighting, etc. The set of images may be from an initial capture of images, for a set of additional images requested by the adjuster or agent 112, additional images provided by the person 110, etc. To this end, the example process of FIG. 2 may be successively carried out more than once for different sets of images.

If the set of images comply with the criteria (block 202), the virtual adjuster 128 starts work on a damage estimate (block 204). If it is unclear whether a part is damaged (block 206), the virtual adjuster 128 calls (e.g., queries) the damage assessor 130 to determine the likelihood or confidence (e.g., percentage) that the part is damaged (block 208). In some examples, the damage assessor 130 is called for each part of the vehicle that could have been damaged by the damage-causing event.

If the confidence satisfies a criteria (e.g., exceeds a threshold) (block 210), the virtual adjuster 128 adds the part in question to the damage estimate 132 as, for example, a line item (block 212). When the damage estimate 132 is complete (block 214), control exits from the example process of FIG. 2, otherwise, control returns to block 204 to continue work on the damage estimate 132.

Figure 3:
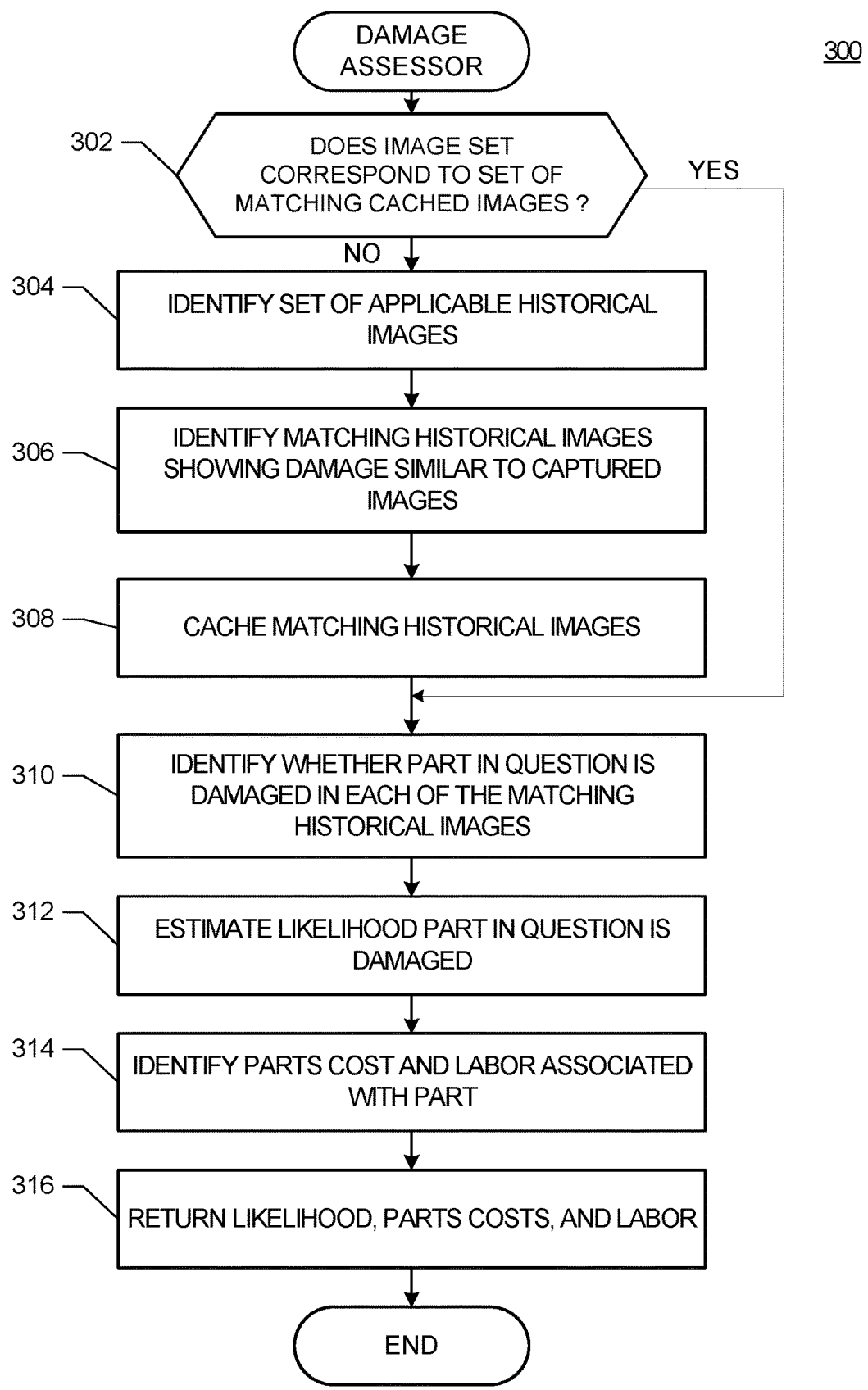
FIG. 3 is a flowchart representative of an example method, hardware logic or machine-readable instructions for implementing the example damage assessor of FIG. 1, in accordance with disclosed embodiments.

A flowchart 300 representative of example processes, methods, software, computer- or machine-readable instructions for implementing the damage assessor 130 is shown in FIG. 3. The processes, methods, software and instructions may be an executable program or portion of an executable program for execution by a processor such as the processor 402 of FIG. 4. The program may be embodied in software or instructions stored on a non-transitory computer- or machine-readable storage medium such as a CD, a hard drive, a DVD, a Blu-ray disk, a cache, a flash memory, a ROM, a RAM, or any other storage device or storage disk associated with the processor 402 in which information is stored for any duration (e.g., for extended time periods, permanently, for brief instances, for temporarily buffering, and/or for caching of the information). Further, although the example program is described with reference to the flowchart illustrated in FIG. 3, many other methods of implementing the example damage assessor 130 may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, an ASIC, a PLD, an FPGA, an FPLD, a logic circuit, etc.) structured to perform the corresponding operation without executing software or firmware.

The example process of FIG. 3 may be called by the example process of FIG. 2, and/or be used by the adjuster or agent 112. The example process begins with the damage assessor 130 determining whether a set of images being processed corresponds to a set of matching images that have been cached (block 302). If the set of images does not correspond to cached images (block 302), the damage assessor 130 identifies a set of applicable historical images based on criteria such as make, model, area damaged, etc. (block 304). The damage assessor 130 compares the captured images 122 with the set of applicable historical images to identify other vehicles having damaged that is similar to that shown in the captured images 122 (block 306). The damage assessor 130 may cache a list of other vehicles, and their images that were identified (block 308).

For each identified vehicle, the damage assessor 130 determines whether a part in question was damaged (block 310). The damage assessor 130 combines the results to determine a likelihood or confidence (e.g., a probability) that the part is damaged in the vehicle being assessed (block 312). In some examples, the damage assessor 130 queries the manufacturer's data 134, the insurance data 136, or the repair data 138 to determine a cost and labor associated with repairing or replacing the part (block 314). The damage assessor 130 returns the likelihood (e.g., percentage), the cost and the labor (block 316), and control exits from the example process of FIG. 3.

Figure 4:
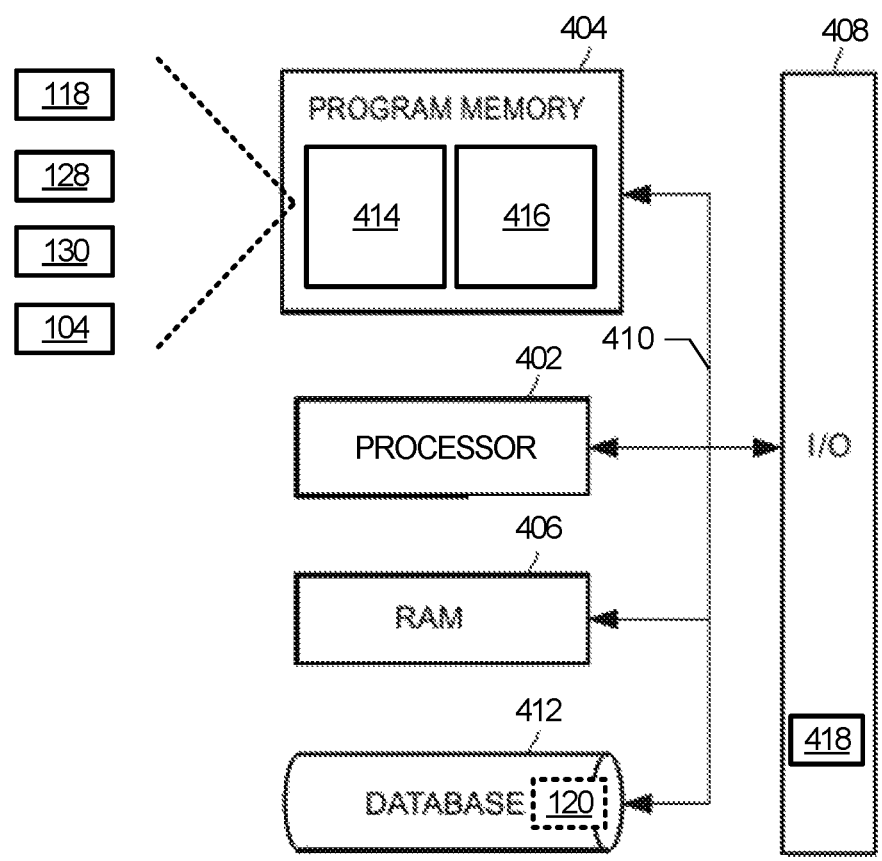
FIG. 4 is a block diagram of an example computing system that may be used to carry out the various user interfaces, methods, functions, etc., for processing insurance claims using historical data, in accordance with disclosed embodiments.

Referring now to FIG. 4, a block diagram of an example computing system 400 to process insurance claims using historic data, in accordance with described embodiments. The example computing system 400 may be used to, for example, implement all or part of the DA server 104, the virtual adjuster 128, the damage assessor 130 and/or, more generally, the system 100.

The computing system 400 includes a processor 402, a program memory 404, a RAM 406, and an input/output (I/O) circuit 408, all of which are interconnected via an address/data bus 410. The program memory 404 may store software, and machine- or computer-readable instructions, which may be executed by the processor 402.

It should be appreciated that although FIG. 4 depicts only one processor 402, the computing system 400 may include multiple processors 402. Moreover, different portions of the example claim processing system 100 may be implement by different computing systems such as the computing system 400. Example processors 402 include a programmable processor, a programmable controller, a graphics processing unit (GPU), a digital signal processor (DSP), an ASIC, a PLD, an FPGA, an FPLD, etc.

The program memory 404 may include memories, for example, one or more RAMs (e.g., a RAM 414) or one or more program memories (e.g., a ROM 416), or a cache (not shown) storing one or more corresponding software, and machine- or computer-instructions. For example, the program memory 404 stores software, and machine- or computer-readable instructions, or computer-executable instructions that may be executed by the processor 402 to implement the any of the DA server 104, the UI 118, the virtual adjuster 128, and/or the damage assessor 130 to processing insurance claims using historical data. Modules, systems, etc. instead of and/or in addition to those shown in FIG. 4 may be implemented. The software, machine-readable instructions, or computer-executable instructions may be stored on separate non-transitory computer- or machine-readable storage mediums or disks, or at different physical locations.

Example memories 404, 414, 416 include any number or type(s) of volatile or non-volatile non-transitory computer- or machine-readable storage medium or disk, such as a semiconductor memories, magnetically readable memories, optically readable memories, hard disk drive (HDD), an optical storage drive, a solid-state storage device, a solid-state drive (SSD), a read-only memory (ROM), a random-access memory (RAM), a compact disc (CD), a compact disc read-only memory (CD-ROM), a digital versatile disk (DVD), a Blu-ray disk, a cache, a flash memory, or any other storage device or storage disk in which information may be stored for any duration (e.g., permanently, for an extended time period, for a brief instance, for temporarily buffering, for caching of the information, etc.).

As used herein, the term non-transitory computer-readable medium is expressly defined to include any type of computer-readable storage device and/or storage disk and to exclude propagating signals and to exclude transmission media. As used herein, the term non-transitory machine-readable medium is expressly defined to include any type of machine-readable storage device and/or storage disk and to exclude propagating signals and to exclude transmission media.

In some embodiments, the processor 402 may also include, or otherwise be communicatively connected to, a database 412 or other data storage mechanism (one or more hard disk drives, optical storage drives, solid state storage devices, CDs, CD-ROMs, DVDs, Blu-ray disks, etc.). In the illustrated example, the database 412 stores the database 120.

Although FIG. 4 depicts the I/O circuit 408 as a single block, the I/O circuit 408 may include a number of different types of I/O circuits or components that enable the processor 402 to communicate with peripheral I/O devices. The peripheral I/O devices may be any desired type of I/O device such as a keyboard, a display (a liquid crystal display (LCD), a cathode ray tube (CRT) display, touch, etc.), a navigation device (a mouse, a trackball, a capacitive touch pad, a joystick, etc.), speaker, a microphone, a button, a communication interface, an antenna, etc.

The I/O circuit 408 may include a number of different network transceivers 418 that enable the computing system 400 to communicate with another computer system, such as the computing system 400 that implement other portions of the claim processing system 100 via, e.g., a network (e.g., the communication network such as the Internet 106). The network transceiver 418 may be a Wi-Fi transceiver, a Bluetooth transceiver, an infrared transceiver, a cellular transceiver, an Ethernet network transceiver, an asynchronous transfer mode (ATM) network transceiver, a digital subscriber line (DSL) modem, a cable modem, etc.

Example methods, apparatus, and articles of manufacture to process insurance claims using historical data are disclosed herein. Further examples and combinations thereof include at least the following.

Example 1 is a method of estimating damage to a vehicle, the method comprising: receiving, using one or more processors, one or more images of damage to a vehicle; identifying, using one or more processors, one or more additional vehicles having damage similar to the damage to the vehicle based on the one or more images; determining, using one or more processors, a likelihood that a part of the vehicle is damaged based on damage associated with the one or more additional vehicles; and determining, using one or more processors, whether to include the part in a repair estimate based on the likelihood.

Example 2 is the method of example 1, further comprising identifying a plurality of vehicles that are similar to the vehicle, wherein the one or more additional vehicles are identified in the plurality of vehicles.

Example 3 is the method of example 2, wherein the plurality of vehicles are identified using machine learning.

Example 4 is the method of example 2 or example 3, wherein the plurality of vehicles are identified based on at least one of make, model, or year.

Example 5 is the method of any of examples 1 to 4, wherein the one or more additional vehicles having damage similar to the damage to the vehicle are identified using machine learning.

Example 6 is the method of any of examples 1 to 5, wherein determining the likelihood includes determining a percentage of the one or more additional vehicles that had the part damaged.

Example 7 is the method of any of examples 1 to 6, further comprising, if the likelihood satisfies a criteria: include the part in the repair estimate; and add a cost associated with repair or replacement of the part to the repair estimate.

Example 8 is the method of example 7, further including determining the cost based on at least one of manufacturer information, dealership information, a labor cost, or parts data.

Example 9 is the method of any of examples 1 to 8, further comprising: receiving a query from a claim adjuster regarding an additional part; and in response to the query, determining, using the one or more processors, an additional likelihood that the additional part of the vehicle is damaged based on damage associated with the one or more additional vehicles, and determining, using the one or more processors, whether to include the additional part in the repair estimate based on the additional likelihood.

Example 10 is a non-transitory machine-readable storage medium storing instructions that, when executed, cause a processor to at least: receive one or more images of damage to a vehicle; identify one or more additional vehicles having damage similar to the damage to the vehicle based on the one or more images; determine a likelihood that a part of the vehicle is damaged based on damage associated with the one or more additional vehicles; and determine whether to include the part in a repair estimate based on the likelihood.

Example 11 is the non-transitory machine-readable storage medium of example 10, wherein the instructions, when executed, cause the processor to identify a plurality of vehicles that are similar to the vehicle, wherein the one or more additional vehicles are identified in the plurality of vehicles.

Example 12 is the non-transitory machine-readable storage medium of example 11, wherein the instructions, when executed, cause the processor to identify the plurality of vehicles based on at least one of a make, a model, or a year.

Example 13 is the non-transitory machine-readable storage medium of any of examples 10 to 12, wherein the instructions, when executed, cause the processor to use machine learning to identify the one or more additional vehicles.

Example 14 is the non-transitory machine-readable storage medium of any of examples 10 to 13, wherein the instructions, when executed, cause the processor to determine the likelihood by determining a percentage of the one or more additional vehicles that had the part damaged.

Example 15 is the non-transitory machine-readable storage medium of any of examples 10 to 14, wherein the instructions, when executed, cause the processor to, if the likelihood satisfies a criteria: include the part in the repair estimate; and add a cost associated with repair or replacement of the part to the repair estimate.

Example 16 is a claim adjuster comprising: a processor and a non-transitory machine-readable storage medium storing instructions that, when executed, cause the processor to at least: receive one or more images of damage to a vehicle; identify one or more additional vehicles having damage similar to the damage to the vehicle based on the one or more images; determine a likelihood that a part of the vehicle is damaged based on damage associated with the one or more additional vehicles; and determine whether to include the part in a repair estimate based on the likelihood.

Example 17 is the claim adjuster of example 16, wherein the instructions, when executed, cause the processor to identify a plurality of vehicles that are similar to the vehicle, wherein the one or more additional vehicles are identified in the plurality of vehicles.

Example 18 is the claim adjuster of example 16 or example 17, wherein the instructions, when executed, cause the processor to determine the likelihood by determining a percentage of the one or more additional vehicles that had the part damaged.

Example 19 is the claim adjuster of any of examples 16 to 18, wherein the instructions, when executed, cause the processor to, if the likelihood satisfies a criteria: include the part in the repair estimate; and add a cost associated with repair or replacement of the part to the repair estimate.

Example 20 is the claim adjuster of any of examples 16 to 19, wherein the instructions, when executed, cause the processor to determine the cost based on at least one of manufacturer information, dealership information, a labor cost, or parts data.

Use of "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise. A device or structure that is "configured" in a certain way is configured in at least that way, but may also be configured in ways that are not listed.

Further, as used herein, the expressions "in communication," "coupled" and "connected," including variations thereof, encompasses direct communication and/or indirect communication through one or more intermediary components, and does not require direct mechanical or physical (e.g., wired) communication and/or constant communication, but rather additionally includes selective communication at periodic intervals, scheduled intervals, aperiodic intervals, and/or one-time events. The embodiments are not limited in this context.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

Moreover, in the foregoing specification, specific embodiments have been described. However, one of ordinary skill in the art appreciates that various modifications and changes can be made in view of aspects of this disclosure without departing from the scope of the invention as set forth in the claims below. Accordingly, the specification and figures are to be regarded in an illustrative rather than a restrictive sense, and all such modifications made in view of aspects of this disclosure are intended to be included within the scope of present teachings.

Additionally, the benefits, advantages, solutions to problems, and any element(s) that may cause any benefit, advantage, or solution to occur or become more pronounced are not to be construed as a critical, required, or essential features or elements of any or all the claims.

Furthermore, although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Finally, any references, including publications, patent applications, and patents cited herein are hereby incorporated in their entirety by reference to the same extent as if each reference were individually and specifically indicated to be incorporated by reference and were set forth in its entirety herein.

Unless a claim element is defined by reciting the word "means" and a function without the recital of any structure, it is not intended that the scope of any claim element be interpreted based on the application of 35 U.S.C. § 112, sixth paragraph.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method of estimating damage to a vehicle, the method comprising:

receiving, by one or more processors, one or more images illustrating damage to an area of a particular vehicle, wherein the one or more images are:
  received, via a network, from an electronic device separate from the one or more processors, and
  digital images captured by an imaging sensor of the electronic device;
selecting, by the one or more processors, based on a vehicle type of the particular vehicle, and from a plurality of machine learning algorithms trained using respective sets of digital images illustrating damaged vehicles of a same vehicle type, a first machine learning algorithm configured to identify similarities between digital images illustrating damaged vehicles of the vehicle type;
identifying, by the one or more processors, using the first machine learning algorithm, a plurality of stored images that are matching in appearance with an image of the one or more images, each image of the plurality of stored images illustrating a damaged vehicle of the vehicle type;
identifying, by the one or more processors, based on previously-processed insurance claims associated with damaged vehicles illustrated in the plurality of stored images, a subset of the plurality of stored images, wherein:
  each image of the subset illustrates a vehicle having damage to a same vehicle component,
  the same vehicle component is identified as damaged by the insurance claims, and
  the same vehicle component is obscured from view in the received one or more images illustrating damage to the area of the particular vehicle;
determining, by the one or more processors, a proportion indicating a likelihood that the same vehicle component of the particular vehicle is damaged, wherein determining the proportion comprises:
  determining a first quantity that indicates a total number of individual vehicles illustrated in the subset of the plurality of stored images, and
  determining a second quantity that indicates a total number of individual vehicles illustrated in the plurality of stored images;
determining, by the one or more processors, that the proportion is greater than a threshold value;
determining, by the one or more processors and based on the proportion being greater than the threshold value, a repair estimate including a cost associated with repair or replacement of the component;
generating, by the one or more processors, a user interface indicating the repair estimate;
providing, by the one or more processors, the user interface such that the repair estimate is output via the user interface;
determining, by the one or more processors, that the repair estimate is within a threshold amount of an actual cost of repair; and
based on determining that the repair estimate is within the threshold amount of the actual cost of repair, augmenting, by the one or more processors, a set of training data to include:
  the received one or more images illustrating damage to the area of the particular vehicle, and
  the repair estimate, wherein
    the augmented set of training data is configured to train a second machine learning algorithm, different from the first machine learning algorithm, to generate a repair estimate.

2. The method of claim 1, wherein the vehicle type is indicative of at least one of make, model, or year.

3. The method of claim 1, wherein the cost is based on at least one of manufacturer information, a labor cost, or repair data of the same vehicle component.

4. The method of claim 1, further comprising:
receiving a query from a claim adjuster regarding an additional component;
in response to the query, determining, by the one or more processors, a likelihood that the additional component of the particular vehicle is damaged based on damage associated with individual vehicles illustrated in the subset of the plurality of stored images;
determining, by the one or more processors, that the likelihood is greater than the threshold value; and
determining, by the one or more processors and based on the likelihood being greater than the threshold value, an additional cost associated with repair or replacement of the additional component to be included in the repair estimate.

5. A non-transitory machine-readable storage medium storing instructions that, when executed, cause a processor to at least:
receive, via a network and from an electronic device separate from the processor, one or more images illustrating damage to an area of a particular vehicle, wherein the one or more images are captured by a digital camera of the electronic device;
select, based on a vehicle type of the particular vehicle, from a plurality of machine learning algorithms trained using respective sets of digital images illustrating damaged vehicles of a same vehicle type, a first machine learning algorithm configured to identify similarities between digital images illustrating damaged vehicles of the vehicle type;
identify, using the first machine learning algorithm, a plurality of stored images that are matching in appearance with an image of the one or more images, each image of the plurality of stored images illustrating a damaged vehicle of the vehicle type;
identify, based on previously-processed insurance claims associated with damaged vehicles illustrated in the plurality of stored images, a subset of the plurality of stored images, wherein:
  each image of the subset illustrates a vehicle having damage to a same vehicle component,
  the same vehicle component is identified as damaged by the insurance claims, and
  the same vehicle component is obscured from view in the received one or more images illustrating damage to the area of the particular vehicle;
determine a proportion indicating a likelihood that the same vehicle component of the particular vehicle is damaged, wherein determining the proportion comprises:
  determining a first quantity that indicates a total number of individual vehicles illustrated in the subset of the plurality of stored images, and
  determining a second quantity that indicates a total number of individual vehicles illustrated in the plurality of stored images;
determine that the proportion is greater than a threshold value;

determine, based on the proportion being greater than the threshold value, a repair estimate including a cost associated with repair or replacement of the component;

generate a user interface indicating the repair estimate;

provide the user interface such that the repair estimate is output via the user interface;

determine that the repair estimate is within a threshold amount of an actual cost of repair; and based on determining that the repair estimate is within the threshold amount of the actual cost of repair, augmenting a set of training data to include:
  the received one or more images illustrating damage to the area of the particular vehicle, and
  the repair estimate, wherein
    the augmented set of training data is configured to train a second machine learning algorithm, different from the first machine learning algorithm, to generate a repair estimate.

6. A claim adjuster, comprising:

a processor; and a non-transitory machine-readable storage medium storing instructions that, when executed, cause the processor to at least:

receive, via a network and from an electronic device separate from the processor, one or more images illustrating damage to an area of a particular vehicle, wherein the one or more images are captured by a digital camera associated with the electronic device;

select, based on a vehicle type of the particular vehicle, from a plurality of machine learning algorithms trained using respective sets of digital images illustrating damaged vehicles of a same vehicle type, a first machine learning algorithm configured to identify similarities between digital images illustrating damaged vehicles of the vehicle type;

identify, using the first machine learning algorithm, a plurality of stored images that are matching in appearance with an image of the one or more images, each image of the plurality of stored images illustrating a damaged vehicle of the vehicle type and having damage to the area;

identify, based on previously-processed insurance claims associated with damaged vehicles illustrated in the plurality of stored images, a subset of the plurality of stored images, wherein;
  each image of the subset illustrates a vehicle having damage to a same vehicle component,
  the same vehicle component is identified as damaged by the insurance claims, and
  the same vehicle component is obscured from view in the received one or more images illustrating damage to the area of the particular vehicle;

determine a proportion indicating a likelihood that the same vehicle component of the particular vehicle is damaged, wherein determining the proportion comprises:
  determining a first quantity that indicates a total number of individual vehicles illustrated in the subset of the plurality of stored images, and
  determining a second quantity that indicates a total number of individual vehicles illustrated in the plurality of stored images;

determine that the proportion is greater than a threshold value;

determine, based on the proportion being greater than the threshold value, a repair estimate including a cost associated with repair or replacement of the component;

generate a user interface indicating the repair estimate;

provide the user interface such that the repair estimate is output via the user interface;

determine that the repair estimate is within a threshold amount of an actual cost of repair; and based on determining that the repair estimate is within the threshold amount of the actual cost of repair, augment a set of training data to include:
  the received one or more images illustrating damage to the area of the particular vehicle, and
  the repair estimate, wherein
    the augmented set of training data is configured to train a second machine learning algorithm, different from the first machine learning algorithm, to generate a repair estimate.

7. The claim adjuster of claim 6, wherein determining the proportion comprises determining a percentage based on the first quantity and the second quantity.

8. The claim adjuster of claim 6, wherein the instructions, when executed, cause the processor to determine the cost based on at least one of manufacturer information, dealership information, a labor cost, or parts data.

9. The method of claim 1, further comprising:

selecting, by the one or more processors and based on the area of the vehicle, the second machine learning algorithm; and determining, by the one or more processors, the repair estimate by providing the one or more images as input to the second machine learning algorithm.

10. The method of claim 9, further comprising:

receiving, by the one or more processors, an actual repair cost of the vehicle; and refining, by the one or more processors and based on a difference between the actual repair cost and the repair estimate, the second machine learning algorithm.

11. The method of claim 1, further comprising:

determining, by the one or more processors, that the one or more images does not satisfy a set of criteria;

displaying, by the one or more processors, on a display the electronic device, a request for additional images; and receiving, by the one or more processors, from the electronic device, and in response to the request, one or more additional images captured from a prescribed set of positions and angles.

12. The non-transitory machine-readable storage medium of claim 5, wherein the cost is based on at least one of manufacturer information or repair data of the component.

13. The non-transitory machine-readable storage medium of claim 5, wherein the repair estimate is determined by the second machine learning algorithm.

14. The claim adjuster of claim 6, wherein the electronic device comprises one of a smartphone, a tablet computer, a drone, or a device communicatively coupled to a drone.

15. The method of claim 1, wherein the electronic device is a first electronic device, and providing the user interface comprises: providing the user interface to a second electronic device, separate from the first electronic device and via a network, such that the user interface, including the repair estimate, is output by a display of the second electronic device.

16. The claim adjuster of claim 6, wherein the electronic device is a first electronic device, and the instructions, when executed, cause the processor to provide the user interface to a second electronic device, separate from the first electronic device.

17. The method of claim 1, further comprising:
determining, by the one or more processors, that the one or more images satisfy a set of criteria for providing as inputs to the first machine learning algorithm.

18. The method of claim 1, further comprising:
training, by the one or more processors and based on the augmented set of training data, the second machine learning algorithm; and
determining, by the one or more processors and using the trained second machine learning algorithm, a repair estimate associated with a set of images illustrating damage to an additional vehicle.

19. The non-transitory machine-readable storage medium of claim 5, the instructions, when executed, further cause the processor to:
train, using the augmented set of training data, the second machine learning algorithm; and
determine, using the trained second machine learning algorithm, a repair estimate associated with a set of images illustrating damage to an additional vehicle.

20. The claim adjuster of claim 6, wherein the instructions, when executed, cause the processor to train, using the augmented set of training data, the second machine learning algorithm.

\* \* \* \* \*